(12) United States Patent
Bevacqua, Jr.

(10) Patent No.: US 7,908,196 B2
(45) Date of Patent: Mar. 15, 2011

(54) SYSTEM, METHOD AND FINANCIAL PRODUCT FOR PROVIDING RETIREMENT INCOME PROTECTION

(75) Inventor: John F. Bevacqua, Jr., West Hartford, CT (US)

(73) Assignee: Deloitte Development LLC, Hermitage, TN (US)

( * ) Notice: Subject to any disclaimer, the term of this patent is extended or adjusted under 35 U.S.C. 154(b) by 389 days.

(21) Appl. No.: 11/329,975

(22) Filed: Jan. 10, 2006

(65) Prior Publication Data
US 2007/0011069 A1    Jan. 11, 2007

Related U.S. Application Data

(60) Provisional application No. 60/642,646, filed on Jan. 10, 2005.

(51) Int. Cl.
*G06Q 40/00* (2006.01)

(52) U.S. Cl. .................................... 705/36 R; 705/35

(58) Field of Classification Search ............... 705/35–45
See application file for complete search history.

(56) References Cited

U.S. PATENT DOCUMENTS

| | | | |
|---|---|---|---|
| 2004/0088236 A1 | 5/2004 | Manning | |
| 2004/0153387 A1 | 8/2004 | Mallozzi | |
| 2004/0177022 A1 | 9/2004 | Williams et al. | |
| 2004/0220872 A1 | 11/2004 | Pollock | |
| 2005/0060209 A1* | 3/2005 | Hill et al. .................... 705/4 |

\* cited by examiner

*Primary Examiner* — Rajesh Khattar
(74) *Attorney, Agent, or Firm* — Kramer Levin Naftalis & Frankel LLP

(57) ABSTRACT

A system and method and a financial income protection product are provided for enabling individuals who are approaching or are in retirement to ensure future sources of income with a reduced initial monetary outlay than conventional income protection products such as, for example, annuities. Income benefits are provided to the individuals only when they need it, i.e., either when market returns have not kept pace with expectations and/or when the individuals have lived beyond the point in time at which their expected wealth expires.

21 Claims, 13 Drawing Sheets

BASIC ANATOMY OF A RETIREMENT PLAN

VALUATION - PUT OPTIONS

PROTECTS $30,000 OF ANNUAL SPENDING; 5.00% AIR

| EXERCISE YEAR | GLIDEPATH | NUMBER OF PUT OPTIONS | STRIKE PRICE | COST OF PUT OPTION (BLACK SCHOLES) | PROBABILITY OF SURVIVORSHIP | ACTUARIAL VALUE OF OPTIONS |
|---|---|---|---|---|---|---|
| 1 | 494,250 | 29 | 1050 | 59.61 | 0.99298 | 1691 |
| 2 | 488,213 | 27 | 1103 | 88.51 | 0.98530 | 2373 |
| 3 | 481,873 | 26 | 1158 | 112.03 | 0.97694 | 2836 |
| 4 | 475,217 | 25 | 1216 | 129.12 | 0.96786 | 3084 |
| 5 | 468,228 | 24 | 1276 | 141.11 | 0.95803 | 3178 |
| 6 | 460,889 | 22 | 1340 | 153.22 | 0.94733 | 3249 |
| 7 | 453,183 | 21 | 1407 | 162.44 | 0.93564 | 3240 |
| 8 | 445,093 | 20 | 1477 | 168.90 | 0.92279 | 3165 |
| 9 | 436,597 | 19 | 1551 | 172.72 | 0.90859 | 3035 |
| 10 | 427,677 | 18 | 1629 | 210.50 | 0.89285 | 3461 |
| 11 | 418,311 | 18 | 1710 | 219.63 | 0.87539 | 3372 |
| 12 | 408,477 | 17 | 1796 | 227.80 | 0.85607 | 3258 |
| 13 | 398,150 | 16 | 1886 | 235.06 | 0.83474 | 3122 |
| 14 | 397,308 | 15 | 1980 | 241.45 | 0.81131 | 2968 |
| 15 | 375,923 | 14 | 2079 | 246.99 | 0.785566 | 2800 |
| | | | | | | |
| 35 | 10,865 | 6 | 5253 | 297.80 | 0.08241 | 140 |
| TOTAL VALUE OF ALL OPTIONS | | | | | | $69,146 |
| TOTAL VALUE OF ALL OPTIONS-WITHOUT DISCOUNT FOR SURVIVORSHIP | | | | | | $120,444 |

FIG. 9

VALUATION - TERMINAL ANNUITY

| | ITEM | AMOUNT |
|---|---|---|
| A | TERMINAL RETIREMENT AGE | 100 |
| B | ANNUAL SPENDING BUDGET | $30,000 |
| C | ASSUMED DISCOUNT RATE | 4.00% |
| D | MORTALITY ASSUMPTION | ANNUITY 2000 TABLE |
| E | COST OF LIFE ANNUITY AT AGE 100 | $90,000 |
| F | PROBABILITY OF 65 YEAR OLD SURVIVING TO AGE 100 | 0.04885 |
| G | 35 YEAR INTEREST DISCOUNT FACTOR AT 4.00% | 0.25342 |
| H | COST OF TERMINAL LIFE ANNUITY [ (E) * (F) * (G) ] | $1,115 |
| I | INITIAL INDEX VALUE | 1000 |
| J | STRIKE PRICE AT AGE 100 (35 YEARS AT AIR OF 5.00%) | 5792 |
| K | INITIAL WEALTH | $500,000 |
| L | REQUIRED ANNUAL RETURN FOR ON INITIAL $500,000 TO ATTAIN $90,000 BALANCE AT TERMINAL RETIREMENT AGE. | 5.31% |
| M | STRIKE PRICE AT AGE 100 (35 YEARS AT AIR OF 5.31%) | 6116 |
| N | NUMBER OF OPTIONS PURCHASED | 500 |
| O | COST OF 35 YEAR CALL OPTION @ 5792 (BLACK SCHOLES) | 364 |
| P | COST OF 35 YEAR CALL OPTION @ 6116 (BLACK SCHOLES) | 347 |
| Q | NET PROCEEDS FROM 500 SHORT POSITIONS AT 5792 AND 500 LONG POSITIONS AT 6116 [(500)*((P)-(Q))] | $8,500 |
| R | ADJUSTED FOR PROBABILITY OF SURVIVORSHIP [(F)*(R)] | $415 |
| S | TOTAL COST OF ANNUITY ADJUSTED FOR TERMINAL WEALTH OFFSET [(H)-(S)] | $700 |

FIG. 11

SYSTEM, METHOD AND FINANCIAL PRODUCT FOR PROVIDING RETIREMENT INCOME PROTECTION

CROSS REFERENCE TO RELATED PROVISIONAL APPLICATION

This application claims the benefit of U.S. Provisional Patent Application No. 60/642,646 filed on Jan. 10, 2005, the disclosure of which is incorporated herein by reference in its entirety.

BACKGROUND OF THE INVENTION

The present invention is directed to a system, method and financial product that enable individuals, especially those who are entering or are in retirement, to ensure future income with a reduced financial outlay. The present invention can be implemented by insurance companies and other financial institutions.

As individuals approach and enter into retirement, their financial profiles change due to the absence of wage income. With the decline in defined benefit pension plans over the past few decades and the modest income benefits and uncertainty of Social Security, most of these individuals will rely primarily on accumulated savings as a means of supporting their future lifestyle needs. Thus, individuals have fixed and limited resources that must fulfill their financial needs for the remainder of their lifetimes.

Recognizing the trend toward longer life expectancies, life insurance companies have historically positioned immediate annuities as a primary source of income protection. This requires individuals to "annuitize," or convert a portion of their savings into a lifetime income stream. FIGS. 1-4 illustrate the basic anatomy of a conventional retirement plan/annuity approach for converting defined contribution savings into lifetime income streams to protect against outliving assets.

While annuitization is an effective way of budgeting a limited amount of savings for retirement (and avoiding investment return risks (see FIG. 2), investment return timing risks (see FIG. 3), and longevity risks (see FIG. 4)), individuals and financial advisors have shied away from these traditional products, including for the following reasons: (i) they are expensive and laden with many fees and unnecessary features, (ii) they are illiquid, and (iii) a substantial economic loss results if the beneficiary dies soon after purchasing the annuity.

The concentration of wealth within the so-called "Baby Boomer" demographic has fueled the creation of new products and services that can more effectively meet the needs and preferences of this demographic. More recent products have presented alternative forms of income protection. However, such products also have their disadvantages.

For example, life insurance companies have introduced guaranteed minimum withdrawal benefits ("GMWB") on deferred annuity contracts, which guarantee that an individual can redeem a specified amount of annual income from their deferred annuity contract regardless of the current account value. While this feature helps to overcome the liquidity and estate issues of immediate annuities, this solution has its shortcomings. Deferred annuity contracts tend to have higher fees than other accumulations vehicles, and, as a result, are generally not viewed favorably within the financial planning community. Additionally, the ability to invest the account balance of a deferred annuity is restricted to a series of mutual funds offered within the product. Also, over the long term, the cost of the GMWB relative to the benefit received will be greater than the corresponding cost of an immediate annuity.

Accordingly, a need exists for an alternative to conventional annuitization that provides income protection at reduced cost. The system, method and financial product according to the present invention provide such an alternative.

SUMMARY OF THE INVENTION

Generally speaking, it is an object of the present invention to provide a new system and method and a financial product that enable individuals to ensure future income with a reduced financial outlay. This is accomplished by providing income benefits to the individuals only when they need it, i.e., either when market returns have not kept pace with expectations and/or when the individuals have lived beyond the point in time at which their expected wealth expires.

The foregoing and other objects, aspects, features and advantages of the invention will in part be obvious and will in part be apparent from this disclosure and accompanying drawings.

The present invention accordingly comprises the various steps and the relation of one or more of such steps with respect to each of the others, and the system embodies features of construction, combinations of elements and arrangement of parts which are adapted to effect such steps, yielding the inventive financial income protection product, all as exemplified in the following detailed disclosure and accompanying drawings, and the scope of the invention will be indicated in the claims.

BRIEF DESCRIPTION OF THE DRAWINGS

For a fuller understanding of the invention, reference is made to the following description, taken in connection with the accompanying drawings, in which:

FIGS. 5-12 illustrate a new approach for converting defined contribution savings into lifetime income streams to protect against outliving assets in accordance with embodiments of the present invention as well as a comparison of the inventive approach and a conventional annuity approach.

DETAILED DESCRIPTION OF THE PREFERRED EMBODIMENTS

Figure 1:
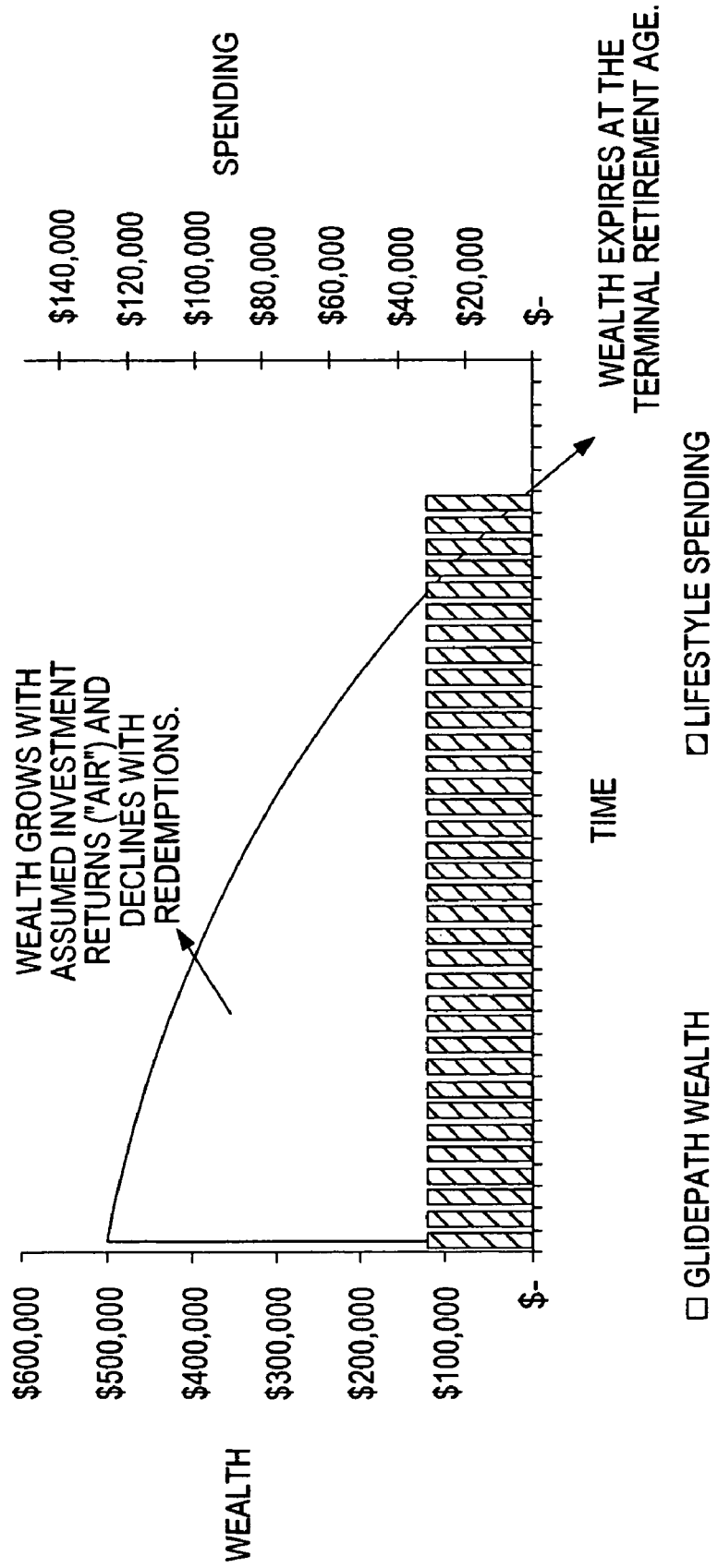
FIGS. 1-4 illustrate various aspects of a conventional retirement plan and a conventional annuity approach for converting defined contribution savings into lifetime income streams to protect against outliving assets.
Figure 2:
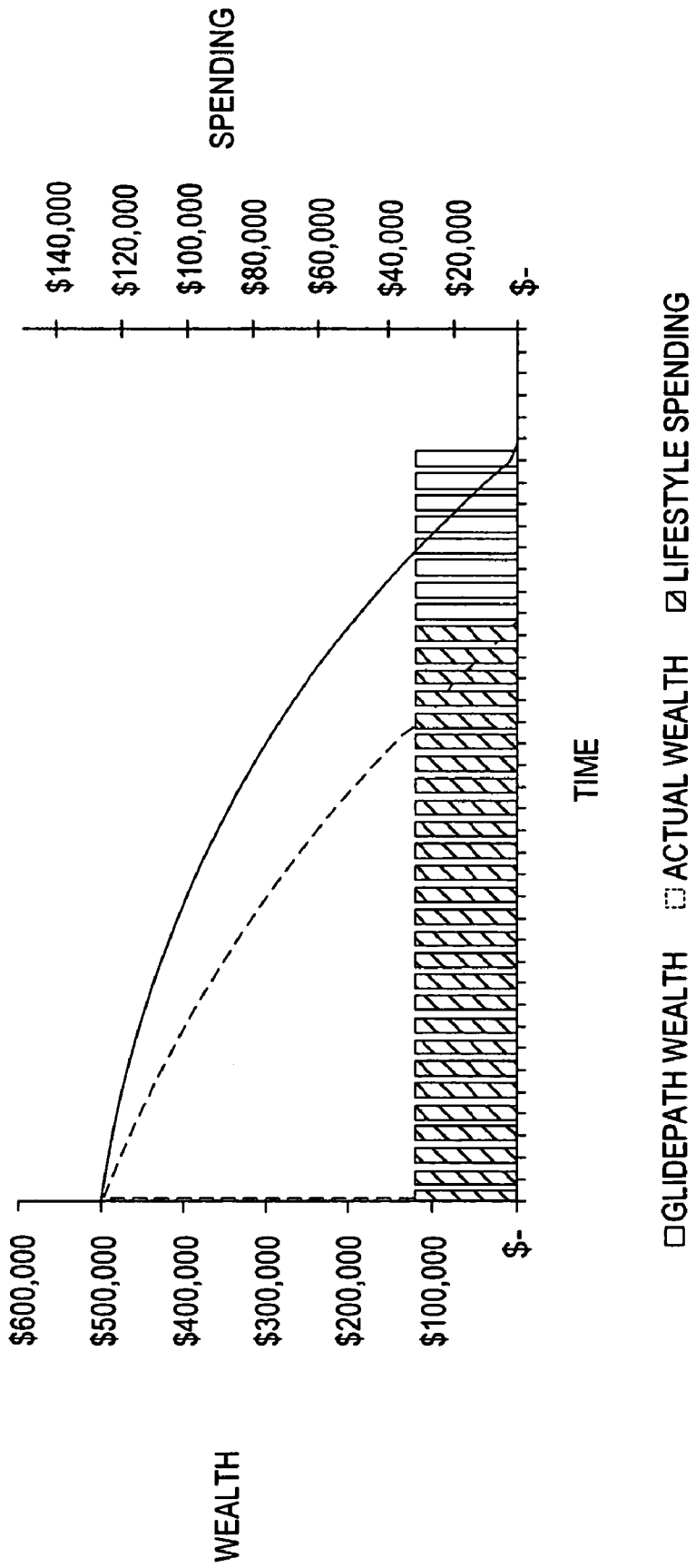
Figure 3:
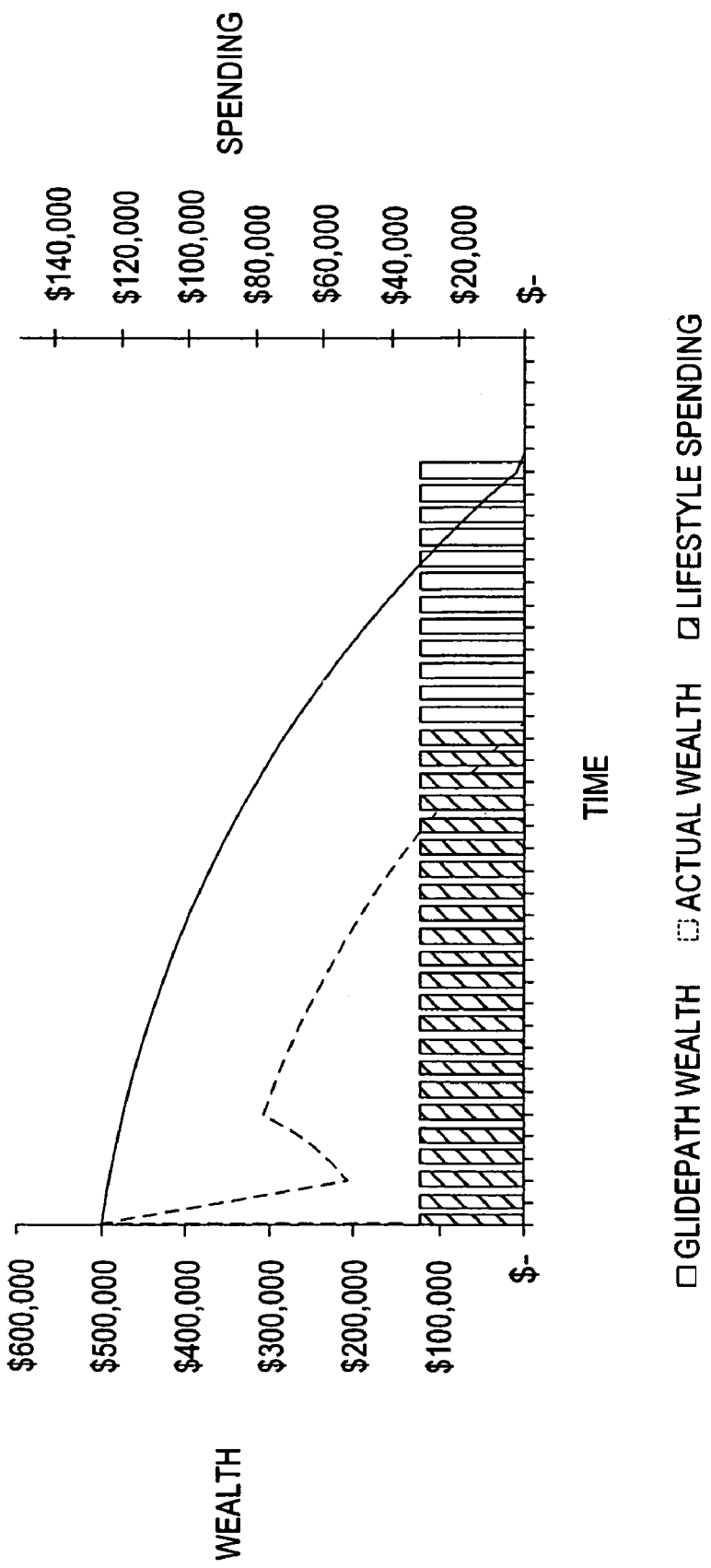
Figure 4:
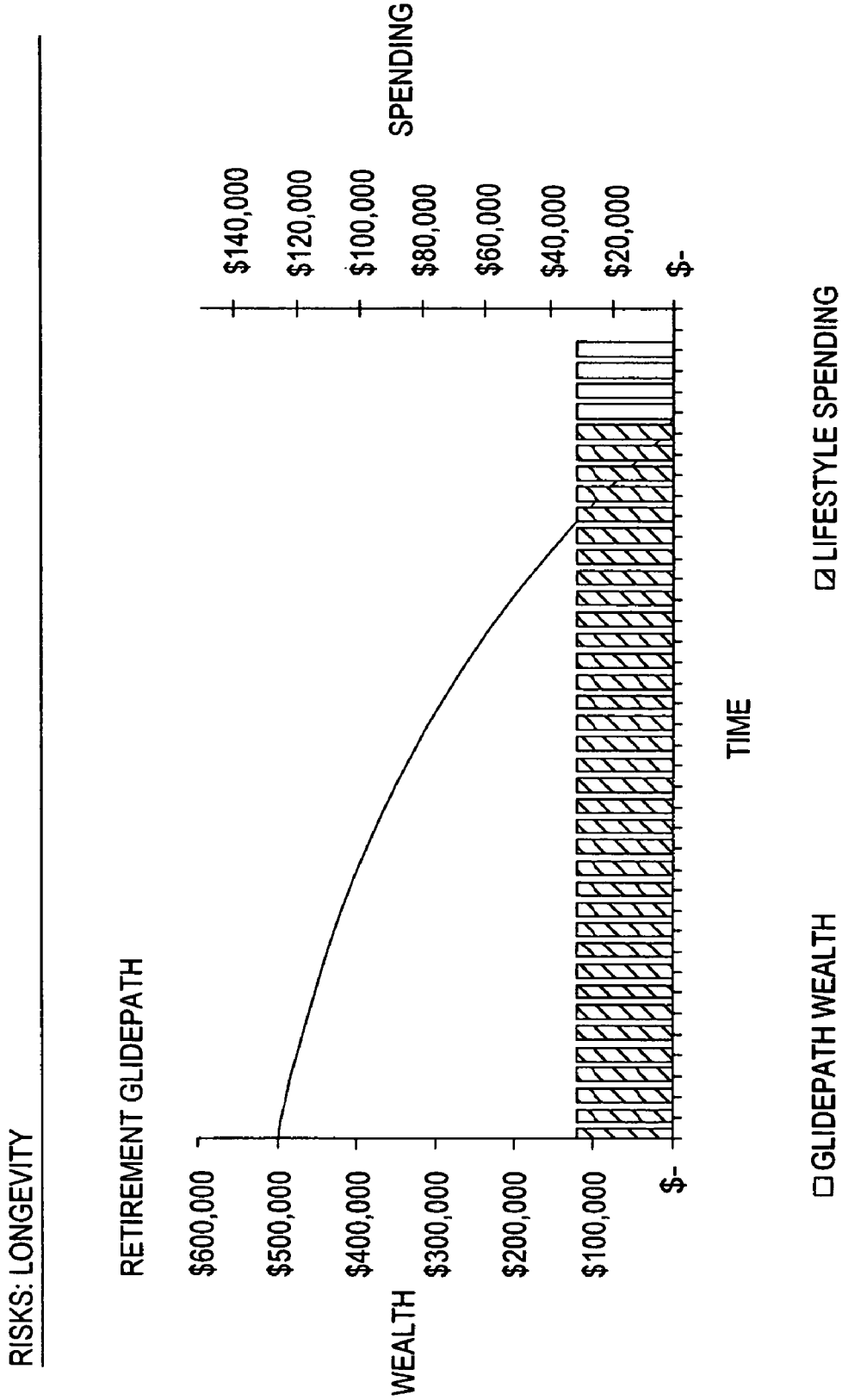

The present invention is directed to a new system and method and a financial product that enable individuals to ensure future income with a reduced financial outlay by providing income benefits to the individuals only when they need it.

The system, method and financial product according to a preferred embodiment of the present invention are now described with reference to a hypothetical example.

Referring to Table 1 set forth below, the example assumes that an individual has $500,000 set aside to provide for their retirement which is expected to cost $30,000 per year for the remainder of the individual's life. If this individual were to establish a retirement plan assuming an investment return of 4.00% per year, the individual's projected wealth would be as follows:

TABLE 1

| Year | Wealth BOY | Investment Returns | Budgeted Redemptions | Wealth EOY |
|---|---|---|---|---|
| 2005 | 500,000 | 19,400 | 30,000 | 489,400 |
| 2006 | 489,400 | 18,976 | 30,000 | 478,376 |
| 2007 | 478,376 | 18,535 | 30,000 | 466,911 |
| 2008 | 466,911 | 18,076 | 30,000 | 454,987 |
| 2009 | 454,987 | 17,599 | 30,000 | 442,587 |
| 2010 | 442,587 | 17,103 | 30,000 | 429,690 |
| 2011 | 429,690 | 16,588 | 30,000 | 416,278 |
| 2012 | 416,278 | 16,051 | 30,000 | 402,329 |
| 2013 | 402,329 | 15,493 | 30,000 | 387,822 |
| 2014 | 387,822 | 14,913 | 30,000 | 372,735 |
| 2015 | 372,735 | 14,309 | 30,000 | 357,045 |
| 2016 | 357,045 | 13,682 | 30,000 | 340,726 |
| 2017 | 340,726 | 13,029 | 30,000 | 323,756 |
| 2018 | 323,756 | 12,350 | 30,000 | 306,106 |
| 2019 | 306,106 | 11,644 | 30,000 | 287,750 |
| 2020 | 287,750 | 10,910 | 30,000 | 268,660 |
| 2021 | 268,660 | 10,146 | 30,000 | 248,806 |
| 2022 | 248,806 | 9,352 | 30,000 | 228,159 |
| 2023 | 228,159 | 8,526 | 30,000 | 206,685 |
| 2024 | 206,685 | 7,667 | 30,000 | 184,352 |
| 2025 | 184,352 | 6,774 | 30,000 | 161,126 |
| 2026 | 161,126 | 5,845 | 30,000 | 136,972 |
| 2027 | 136,972 | 4,879 | 30,000 | 111,850 |
| 2028 | 111,850 | 3,874 | 30,000 | 85,724 |
| 2029 | 85,724 | 2,829 | 30,000 | 58,553 |
| 2030 | 58,553 | 1,742 | 30,000 | 30,296 |
| 2031 | 30,296 | 612 | 30,000 | 907 |
| 2032 | 907 | 18 | 925 | 0 |

This projected pattern of wealth will be referred to hereinafter as the individual's "Retirement Glidepath." Assuming that investment returns are at least 4.00% and the individual does not live beyond the year 2032, the planned retirement can be sustained.

The financial product according to the present invention provides an income benefit when the individual's "Indexed Wealth" (initial wealth available for retirement less "Budgeted Redemptions," all accumulated at annual rates of interest equal to the actual returns of a specified index, such as, for example, the S&P 500, or combination of indices) is below the corresponding Glidepath amount or the individual lives beyond his/her "Terminal Retirement Age" and the Indexed Wealth at the Terminal Retirement Age is less than the "Terminal Annuity Value."

"Budgeted Redemptions" are the amounts each year that the individual plans on redeeming from investments to support lifestyle needs. The "Terminal Retirement Age" refers to the point in time at which the individual's pattern of expected future wealth (Retirement Glidepath) goes to zero. The "Terminal Annuity Value" refers to the commuted cost of a life annuity for the individual as of the individual's Terminal Retirement Age at a specified valuation interest rate and mortality basis that will sustain a prescribed annual lifestyle amount for the remainder of the individual's life.

Figure 5:
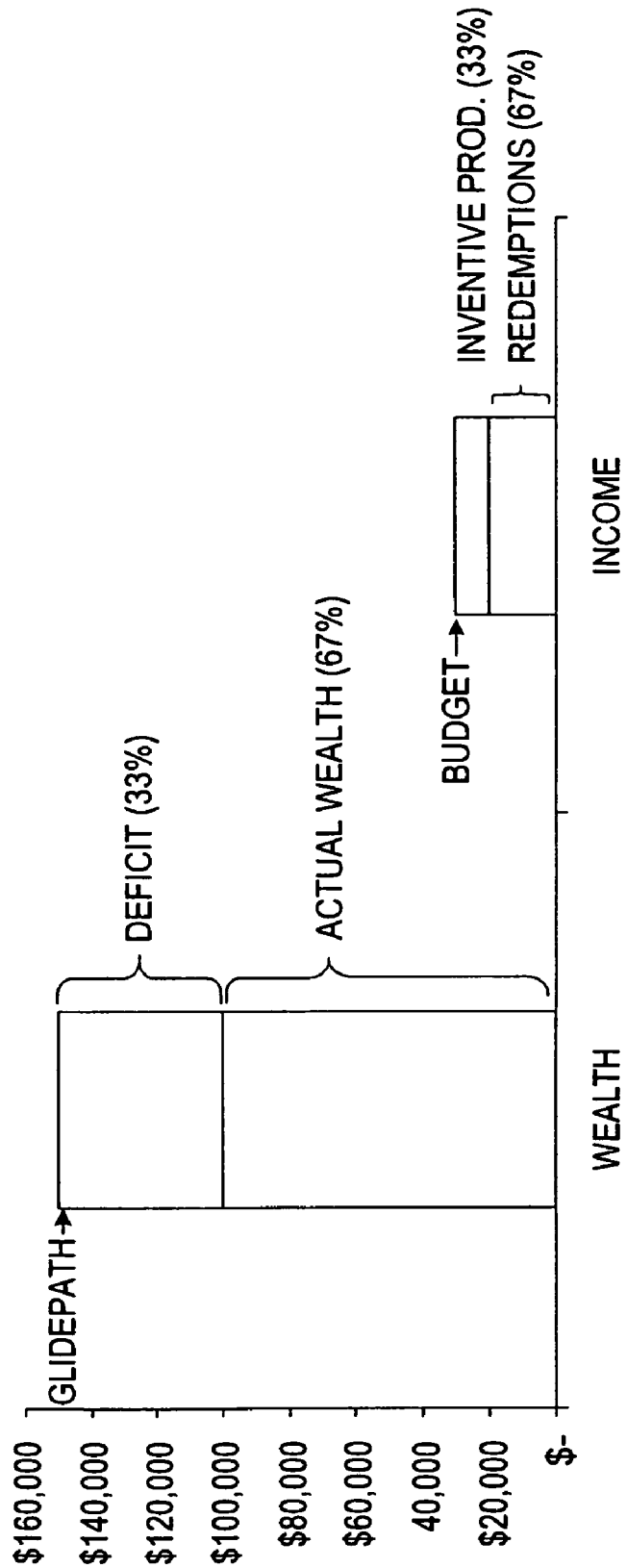

The amount of the income benefit paid prior to the Terminal Retirement Age under the embodiment of the inventive financial product under discussion is proportional to a "Glidepath Deficit," which represents the excess (if any) of the Retirement Glidepath over the Indexed Wealth, that is, how far off the Indexed Wealth is from the Glidepath, i.e., the further below the Glidepath, the greater the benefit (see FIG. 5). When the Indexed Wealth is below the Glidepath, the income benefit payable can be calculated according to the following formula:

$$BudgetedRedemption_t \times \left[1 - \left(\frac{IndexedWealth_t}{RetirementGlidepath_t}\right)\right]$$

Referring to the example under discussion, if, at the beginning of year 2013, the individual's Indexed Wealth is only $300,000, as compared to the Glidepath amount of $402,329, the income benefit payable for that year would be 30,000* [1−(300,000/402,329)]=$7,630.

It should be understood that when the Indexed Wealth is greater than the corresponding Glidepath amount, no benefit is paid.

Should the individual live beyond the Terminal Retirement Age (e.g., beyond 2032 in the example under discussion) and the Indexed Wealth at the Terminal Retirement Age (i.e., at time TRA) is less than the Terminal Annuity Value, a Terminal Annuity Benefit can be paid that, along with (e.g., reduced by) any terminal wealth, will enable the individual to obtain a full lifetime annuity (e.g., $30,000 per year according to the example discussed above) at that time. This annual life-contingent income benefit can be calculated as follows:

$$BudgetedRedemption_{TRA} \times \left[1 - \left(\frac{IndexedWealth_{TRA}}{TerminalAnnuityValue_{TRA}}\right)\right]$$

This benefit can be reduced to the extent that the actual Indexed Wealth exceeds the Glidepath at the Terminal Retirement Age.

Figure 6:
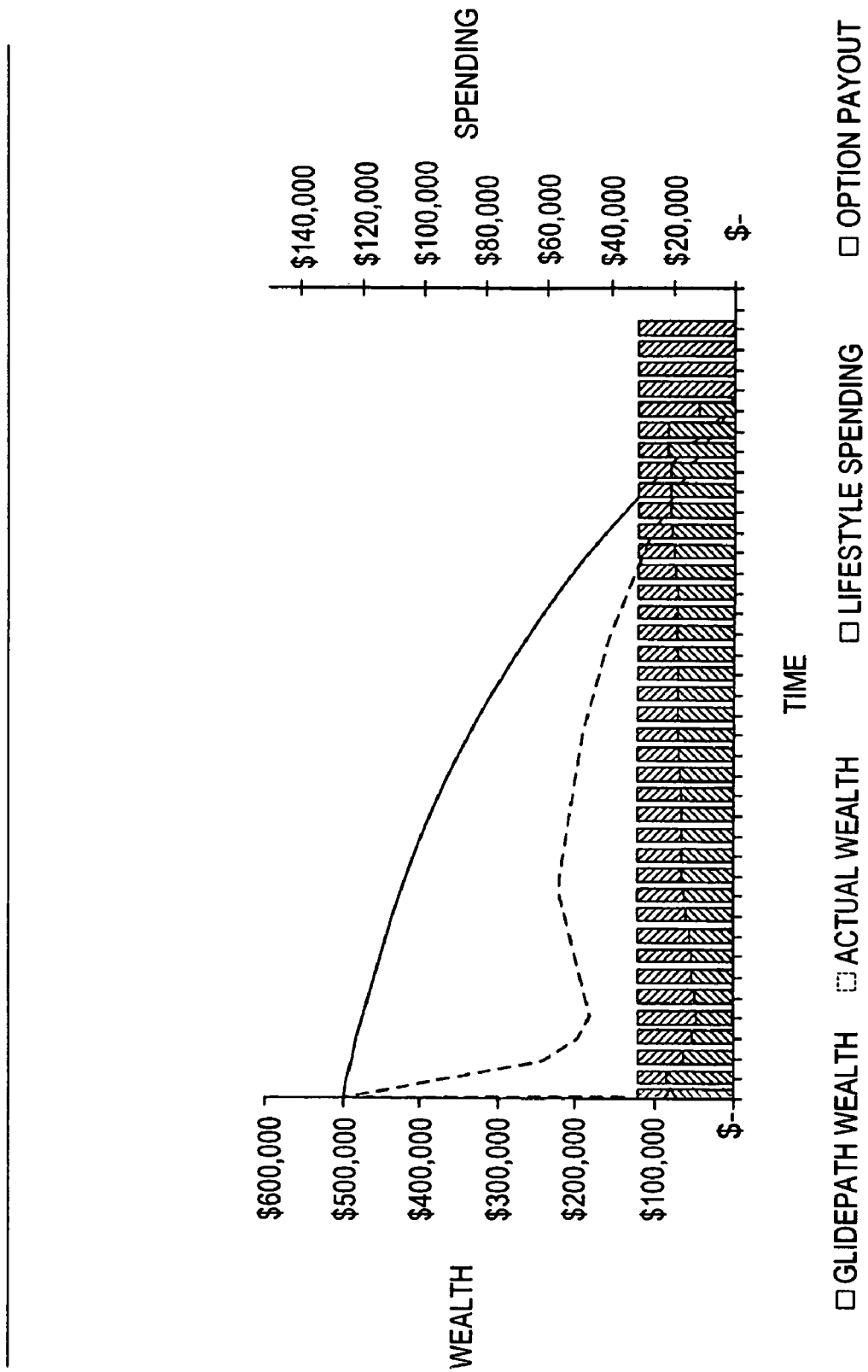
Figure 7:
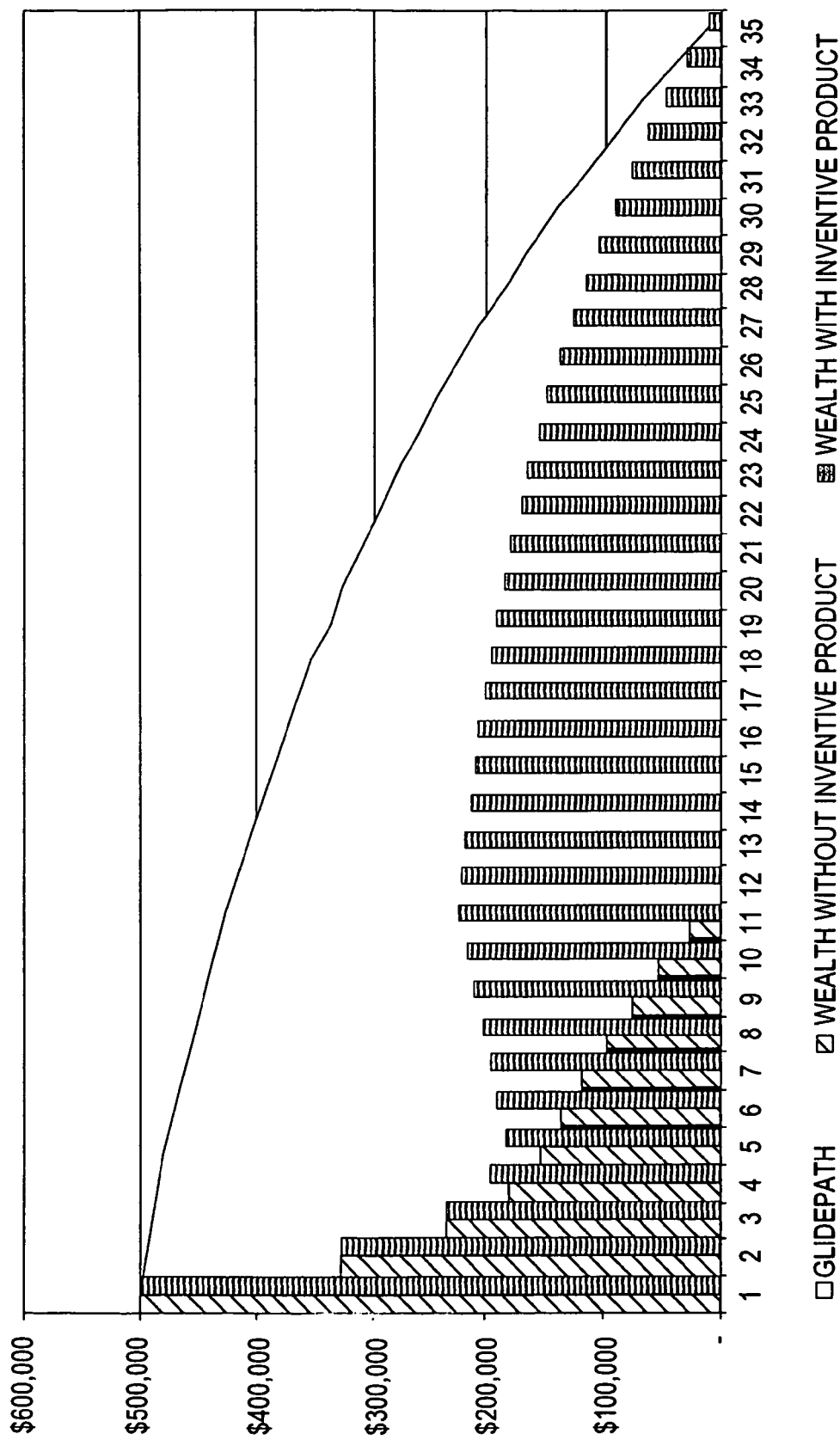

Assuming that the individual's investments match the returns of the specified indices, the benefit arrangement according to the present invention ensures that a desired lifestyle can be sustained for the remainder of the individual's life. As illustrated in FIGS. 6 and 7, the nature of the income benefit precludes the full consumption of wealth so long as actual redemptions are equal to or less than Budgeted Redemptions and actual investment returns match the returns of the specified indices.

Further, should the individual survive to the Terminal Retirement Age, the combination of actual wealth at that time and the Terminal Annuity Benefit will provide the budgeted amount of income for the remainder of the individual's life.

It should be appreciated that the benefit payable under the financial income protection product according to the present invention is an indexed-linked benefit rather than a benefit linked to actual returns on an actual investment portfolio (that is, it is a benefit linked to Indexed Wealth and not actual wealth). One rationale for this approach is based on account administrative advantage/portability—that is, the administration required to track actual wealth would require that the issuer (e.g., insurance company) of the inventive financial product also hold custody of the actual investments to ensure that their current values are being appropriately represented. This requirement might diminish the perceived value of the benefit, as individuals or financial advisors may wish to use other providers to manage wealth. While it might be possible for the issuing insurance company to partner with other institutions to provide a network to a client or an advisor, the administrative requirements to facilitate the required amount of information sharing to appropriately service the product could be onerous.

Another rationale for the indexed-linked approach factors into account hedging—that is, individuals can hedge against the issuing insurance company by moving their funds into indexed funds or other investments. Also, the issuing insurance company can easily hedge risk, as exchange traded options are readily available for most major indices.

Accordingly, the responsibility for ensuring that a well-diversified set of investments is held and that an appropriate mix of indices is selected that match the targeted asset allocation of the investment portfolio lies with the financial advisor and, ultimately, the individual client, and is within the skill of those involved in the relevant art.

Figure 8:
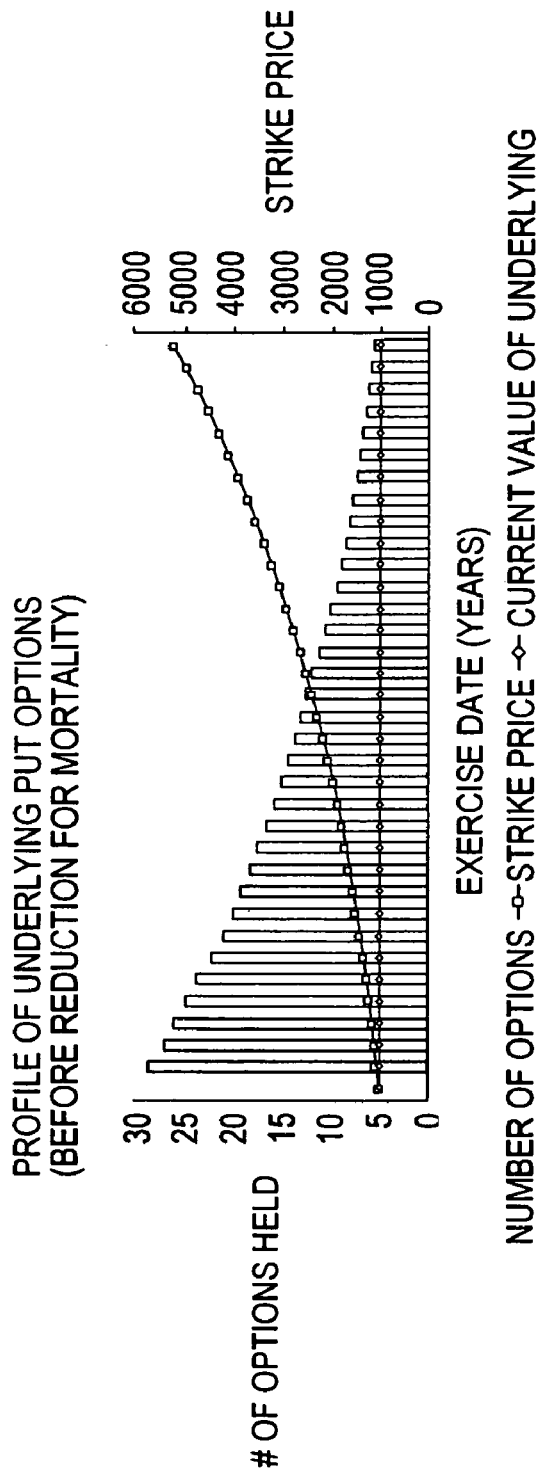

Referring to FIGS. 8 and 9, the benefits received prior to the Terminal Retirement Age can be valued by recognizing these benefits as a series of annual life contingent put options tied to the respective index or mix of indices. As a result, a standard Black Scholes formula may be used which is calibrated to current risk free interest rate levels and implied volatilities observed in exchange traded options. Because these put options extend for many years and exchange traded options are typically available in lengths of no more than five years, implied volatilities are preferably valued conservatively to reflect the risk that the hedging instruments are shorter than the liability. Rigorous stochastic-on-stochastic modeling can be used to assess the risk profile net of the prescribed hedging strategy.

Referring to FIG. 8, the strike price of the put options start "at-the-money" (i.e., when the strike price is below the market price of the underlying asset) and will increase each year at the assumed investment return ("AIR") for the Glidepath, and the number of put options held each year will decline by the AIR. The net effect is that the full amount of budgeted spending can be provided by the options when the value of the "underlying" (i.e., the security that must be delivered when a put or call option is exercised) is zero.

Preferably, the valuation also reflects an appropriate mortality assumption and recognizes any applicable loads for expenses, capital and profit.

Figure 10:
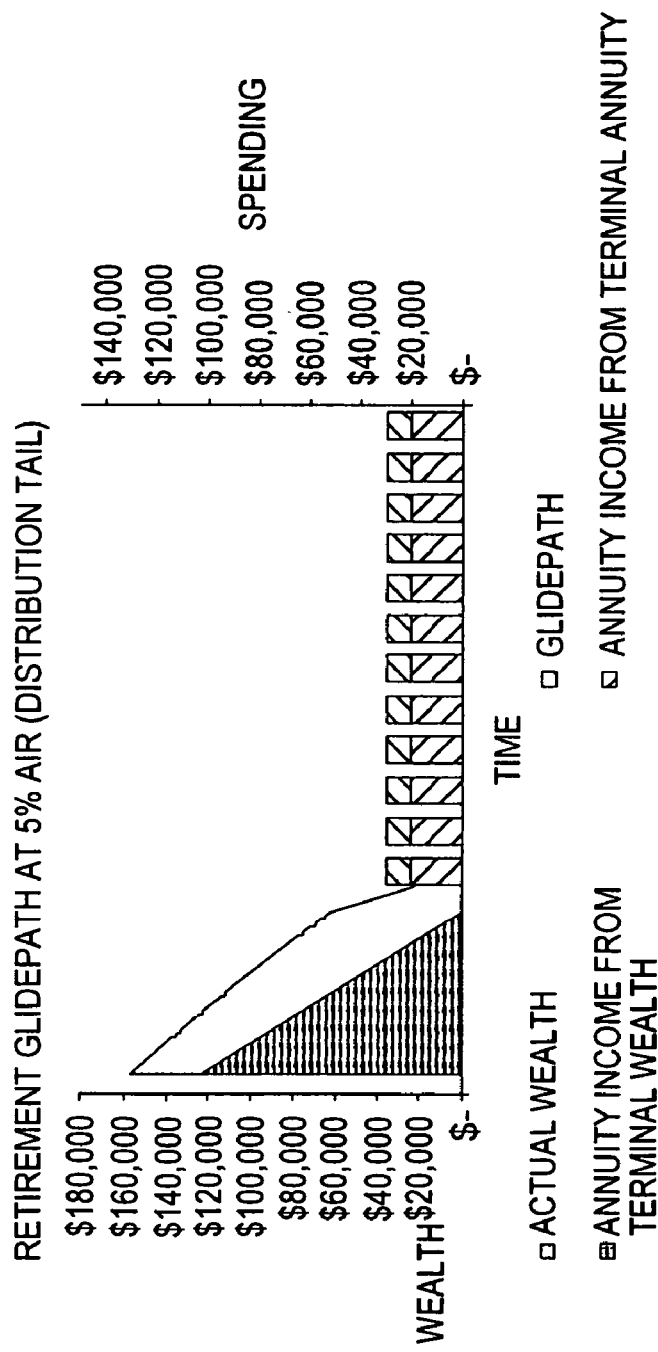

Referring to FIGS. 10 and 11, valuing the Terminal Annuity Benefit is based on the recognition that the Terminal Annuity Benefit is effectively a combination of long and short life contingent call options with the exercise date being the Terminal Retirement Age and an underlying that corresponds to the selected index or mix of indices. The long call option preferably has a strike price that is established at the level at which the index would be assuming the Indexed Wealth at the Terminal Retirement Age is zero, and the strike price of the short call option is preferably established at a level at which the index would be if the Indexed Wealth at the Terminal Retirement Age is equal to the Terminal Annuity Value. Since multiple paths can give rise to a specified Indexed Wealth amount at the Terminal Retirement Age, each of which results in a different index value at that time, the value of the long and short call option can be determined using conventional stochastic modeling.

Also, the long duration nature of these call options may require the use of a conservative implied volatility assumption to account for the fact that the hedging instruments are of shorter duration than are the liabilities.

In accordance with further embodiments of the inventive financial income protection product, additional benefits can also be made available to the individual. These include "Step-Ups." Under a Step-Up, the individual can have the opportunity to increase the amount of the Budgeted Redemptions or increase the AIR after the issue date of the inventive product. This may be used by an individual to (i) spread the cost of the product over a period of time instead of paying a single lump sum premium, or (ii) lock-in protection on a higher amount of wealth that might arise from favorable investment returns after purchasing the inventive product.

A Step-Up can be valued at the time of election by modifying the prospective Retirement Glidepath to reflect the new AIR and/or new Budgeted Redemptions and determining the incremental cost of the coverage using methods described above.

If an individual desires to utilize a Step-Up to spread the cost of the inventive product over a longer period of time, the individual risks the chance that the cost of the enhanced benefit in the future may be more expensive. For example, if the specified index has not kept pace with the AIR and the Indexed Wealth is less than the Retirement Glidepath, the cost of the Step-Up will be greater. To avoid this risk, the individual can lock-in the cost of a Step-Up.

The price lock-ins for Step-Ups are essentially a compound option, and more specifically a call option on the benefit of the inventive product. Standard Black Scholes formulae can be used to value the benefits prior to the Terminal Retirement Age and stochastic modeling can be used to value the cost of any enhanced Terminal Annuity Benefit. The price lock-ins are preferably for a specified amount of additional Step-Up to be exercised within a specified period of time.

Re-blending of selected indices is another benefit that can be made available to the individual in accordance with an alternative embodiment of the present invention. For a variety of reasons, an individual may wish to change his/her asset allocation and, as a result, necessitate a change in the mix of indices used to drive the benefit under the inventive product. This could require adjusting either the Retirement Glidepath or the Budgeted Redemptions to make sure that the value of the revised benefit does not exceed the value of the benefit prior to the change in index mix. For example, if the retirement portfolio has experienced significant losses, the individual may wish to shift their allocation away from more risky investments and toward more conservative investments. In the absence of any other adjustment, re-balancing the indices away from more volatile indices and toward less volatile indices can reduce the value of the benefit under the inventive financial product. To mitigate this, the Glidepath can be increased by a percentage factor until the value of the benefit under the inventive product is equivalent to the value that existed under the old mix of indices.

Figure 13:
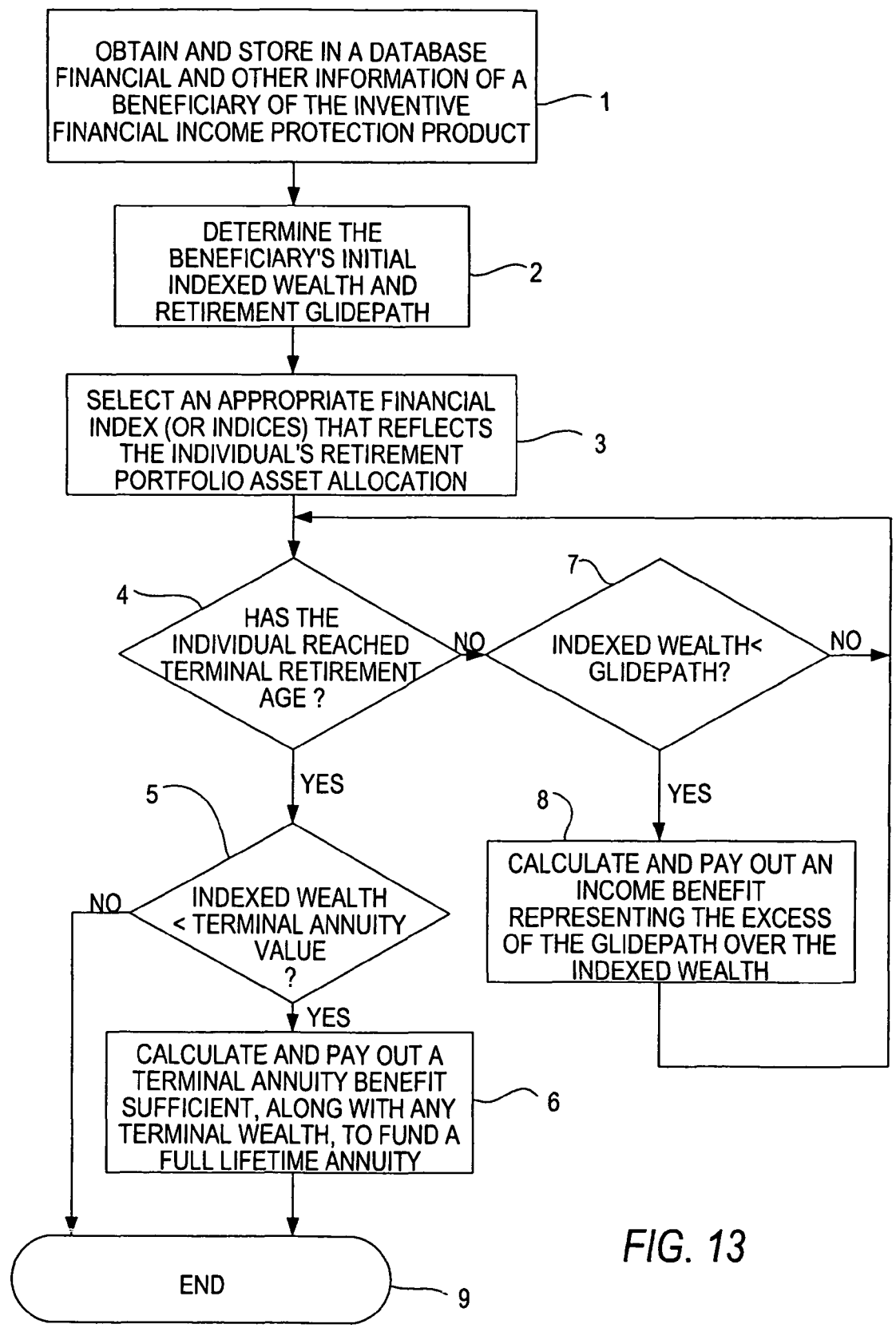
FIG. 13 is a high-level flowchart depicting process steps for implementing a financial income protection product according to a preferred embodiment of the present invention.

Referring now to FIG. 13, there are shown the process steps for implementing a financial product for an individual according to a preferred embodiment of the present invention. In a first step (step 1) financial and necessary administrative information regarding the individual are obtained and, desirably, stored in one or more computer databases.

The individual's available retirement funds (initial Indexed Wealth) and future lifestyle requirements (Retirement Glidepath) are determined (step 2), and an appropriate financial index (or indices) that reflects the asset allocation that the individual plans on using for their retirement portfolio is selected (step 3).

When the individual's Indexed Wealth at a specified point in time prior to the individual's Terminal Retirement Age (see decision 4) is less than the corresponding Glidepath amount (see decision 7), an income benefit representing the excess of the Glidepath amount over the Indexed Wealth is calculated and made available to the individual (step 8). When the Indexed Wealth is greater than the corresponding Glidepath amount, no benefit is paid, and the process revisits decision 4.

When the individual reaches Terminal Retirement Age (see decision 4) and the Indexed Wealth is less than the Terminal Annuity Value (see decision 5), a Terminal Annuity Benefit sufficient, along with any terminal wealth, to enable the individual to fund a full lifetime annuity is calculated and made available to the individual (step 6). When, at the individual's Terminal Retirement Age, the Indexed Wealth is greater than the Terminal Annuity Value, the process ends (step 9).

Figure 12:
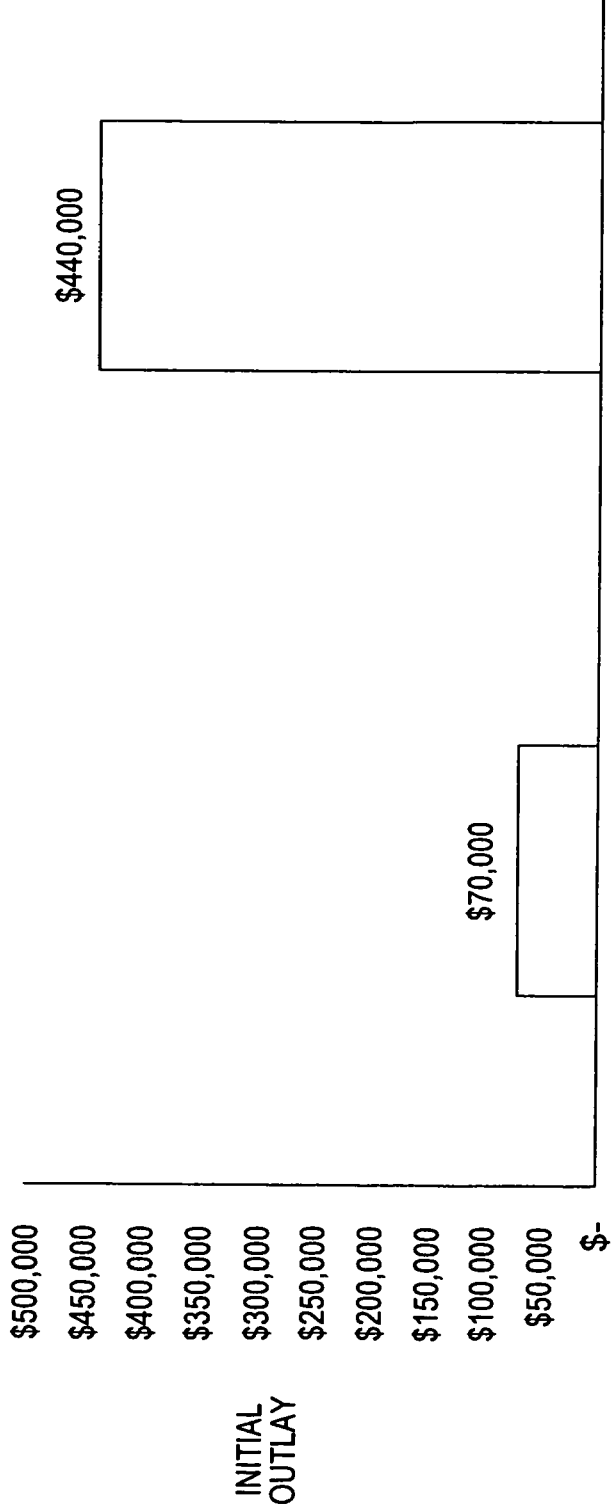

It should be appreciated that because the financial income protection product according to the present invention pays an income benefit only when financial markets underperform, it can provide income protection at a much lower cost than a life annuity. Referring to FIG. 12, as a comparison, a male age 65 who wishes to protect a lifestyle of $30,000 per year might spend as much as $440,000 for a life annuity while the inventive product would cost significantly less, e.g., about $70,000. As a result, the individual can retain an additional $370,000 in assets which he can manage and have available in his estate should he die soon after retirement.

To fully appreciate the value of the inventive financial income protection product, a comparison against a simple retirement plan under a redemption strategy is helpful. Under such a redemption strategy, an individual can project their future wealth in retirement once the following have been defined: (i) the amount of wealth available to support retirement, (ii) an AIR on this wealth, and (iii) the amount of funds to be redeemed each year to support lifestyle needs. Most individuals will observe a downward trend in their projected wealth, as redemptions exceed investment returns, and eventually projected wealth will decline to zero (see e.g., FIG. 7). Two fundamental risks associated with a redemption strategy become apparent: (i) cumulative investment returns are less than cumulative returns under the AIR, resulting in an actual amount of wealth that is below the Retirement Glidepath, and (ii) when the individual lives beyond his/her Terminal Retirement Age, the amount of actual wealth at that time (which would be greater than zero only if actual investment returns exceeded the AIR) is insufficient to provide for a life annuity that can support future lifestyle needs.

In accordance with the foregoing, the present invention avoids the above disadvantages and provides a new approach for converting defined contribution savings into lifetime income streams to protect against outliving assets by providing income benefits to the individuals only when they need it, i.e., either when market returns have not kept pace with expectations and/or when the individuals have lived beyond the point in time at which their expected wealth expires. The present invention provides the protection of a fixed annuity at a much lower initial outlay, and guarantees the realization of a minimum return equal to the AIR at much lower cost than utilizing put options (due to mortality discounts).

The system, method and financial product according to the present invention can be implemented using a related combination of automated interfaces and manual processes. It should be appreciated, however, that greater use of automated processing and a wider range of features with multiple executions is also contemplated by the present invention.

In so far as embodiments of the invention described herein are implemented, at least in part, using software controlled programmable processing devices, such as a computer system, it will be appreciated that one or more computer programs for configuring such programmable devices or system of devices to implement the foregoing described inventive financial income protection product are to be considered an aspect of the present invention. The computer programs can be embodied as source code and undergo compilation for implementation on processing devices or a system of devices, or can be embodied as object code, for example. Those of ordinary skill in the art will readily understand that the term computer in its most general sense encompasses programmable devices such as those referred to above, and data processing apparatus, computer systems and the like. Preferably, the computer programs are stored on carrier media in machine or device readable form, for example in solid-state memory or magnetic memory, and processing devices utilize the programs or parts thereof to configure themselves for operation.

It will thus be seen that the objects set forth above, among those made apparent from the preceding description and the accompanying drawings, are efficiently attained and, since certain changes can be made in carrying out the above method and in the constructions set forth for the system and product without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for providing retirement income protection, the method comprising the steps of:
   determining available retirement funds of an individual;
   using a data processor, calculating a projected pattern of wealth of said individual for a period ending at a terminal retirement age based on selection of at least one financial index representative of an asset allocation for a retirement portfolio of said individual, said available retirement funds including initial wealth of said individual available for retirement less future budgeted lifestyle financial requirements of said individual accumulated at a rate of return equal to about an actual return of said at least one financial index;
   when, prior to said terminal retirement age, said available retirement funds of said individual are less than a corresponding projected wealth amount of said projected pattern of wealth of said individual, (i) calculating using said data processor a payment in an amount proportional to the excess of said corresponding projected wealth amount over said available retirement funds, and (ii) providing said payment to said individual;
   wherein no payment to said individual is calculated or paid when said available retirement funds of said individual are at least one of greater than and equal to said corresponding projected wealth amount of said projected pattern of wealth of said individual.

2. The method according to claim 1, further comprising the steps of calculating and providing to said individual a terminal annuity benefit sufficient to fund a lifetime annuity, taking into account any terminal wealth of said individual, when said individual reaches said terminal retirement age and said available retirement funds are less than a terminal annuity value.

3. The method according to claim 2, wherein said terminal annuity benefit has a value equivalent to a combination of long and short life contingent call options having an exercise date of said terminal retirement age and an underlying corresponding to said at least one financial index.

4. The method according to claim 1, wherein said payment is one of a series of payments having a value equivalent to annual life contingent put options corresponding to said at least one financial index.

5. The method according to claim 4, wherein said value takes into account at least one of mortality assumptions, loads, capital and profit.

6. The method according to claim 1, further comprising the steps of calculating and providing to said individual a step-up benefit.

7. The method according to claim 6, wherein said step-up benefit is valued by modifying said projected pattern of wealth of said individual to account for changes in at least one of an assumed investment return and said future budgeted lifestyle financial requirements of said individual.

8. The method according to claim 1, further comprising the step of re-blending said at least one financial index.

9. The method according to claim 1, wherein said at least one financial index is the S&P 500.

10. A system for providing retirement income protection, comprising a data processor adapted to (i) receive at least one input representing an amount of available retirement funds of an individual, (ii) project a pattern of wealth of said individual for a period ending at a terminal retirement age based on selection of at least one financial index representative of an asset allocation for a retirement portfolio of said individual, said available retirement funds including initial wealth of said individual available for retirement less future budgeted lifestyle financial requirements of said individual accumulated at a rate of return equal to about an actual return of said at least one financial index, and (iii) when prior to said terminal retirement age said available retirement funds of said individual are less than a corresponding projected wealth amount of said individual (a) calculate a payment in an amount proportional to the excess of said corresponding projected wealth amount over said available retirement funds, and (b) provide said payment to said individual, wherein no payment to said individual is calculated or paid when said available retirement funds of said individual are at least one of greater than and equal to said corresponding projected wealth amount of said projected pattern of wealth of said individual.

11. The system according to claim 10, wherein said data processor is further adapted to calculate and generate a terminal annuity benefit sufficient to fund a lifetime annuity, taking into account any terminal wealth of said individual, when said individual reaches said terminal retirement age and said available retirement funds are less than a terminal annuity value.

12. The system according to claim 11, wherein said terminal annuity benefit has a value equivalent to a combination of long and short life contingent call options having an exercise date of said terminal retirement age and an underlying corresponding to said at least one financial index.

13. The system according to claim 10, wherein said payment is one of a series of payments having a value equivalent to annual life contingent put options corresponding to said at least one financial index.

14. The system according to claim 13, wherein said value takes into account at least one of mortality assumptions, loads, capital and profit.

15. The system according to claim 10, wherein said data processor is further adapted to calculate and generate a step-up benefit.

16. The system according to claim 15, wherein said step-up benefit is valued by modifying said projected pattern of wealth of said individual to account for changes in at least one of an assumed investment return and said future budgeted lifestyle financial requirements of said individual.

17. A computer program product comprising a computer usable non-transitory medium storing a computer executable program to: (i) effect receipt of at least one input representing an amount of available retirement funds of an individual, (ii) project a pattern of wealth of said individual for a period ending at a terminal retirement age based on at least one financial index representative of an asset allocation for a retirement portfolio of said individual, said available retirement funds including initial wealth of said individual available for retirement less future budgeted lifestyle financial requirements of said individual accumulated at a rate of return equal to about an actual return of said at least one financial index, and (iii) when prior to said terminal retirement age said available retirement funds of said individual are less than a corresponding projected wealth amount of said individual, (a) calculate a payment in an amount proportional to the excess of said corresponding projected wealth amount over said available retirement funds, and (b) provide said payment to said individual, wherein no payment to said individual is calculated or paid when said available retirement funds of said individual are at least one of greater than and equal to said corresponding projected wealth amount of said projected pattern of wealth of said individual.

18. The computer program product according to claim 17, wherein said computer executable program is further adapted to calculate and generate a terminal annuity benefit sufficient to fund a lifetime annuity, taking into account any terminal wealth of said individual, when said individual reaches said terminal retirement age and said available retirement funds are less than a terminal annuity value.

19. The computer program product according to claim 17, wherein said computer executable program is further adapted to calculate and generate a step-up benefit.

20. The method according to claim 1, wherein said step of calculating a payment is effected according to the following relationship:

$$BudgetedRedemption_t \times \left[1 - \left(\frac{IndexedWealth_t}{RetirementGlidepath_t}\right)\right]$$

where:
BudgetedRedemption$_t$ is a future budgeted lifestyle financial requirement of said individual,
IndexedWealth$_t$ is said wealth of said individual available for retirement less said budgeted lifestyle financial requirements of said individual accumulated at said rate of return equal to about an actual return of said at least one financial index, and
RetirementGlidepath$_t$ is said projected wealth of said individual.

21. The method according to claim 2, wherein said step of calculating a terminal annuity benefit is effected according to the following relationship:

$$BudgetedRedemption_{TRA} \times \left[1 - \left(\frac{IndexedWealth_{TRA}}{TerminalAnnuityValue_{TRA}}\right)\right]$$

where:
BudgetedRedemption$_{TRA}$ is a future budgeted lifestyle financial requirement of said individual,
IndexedWealth$_{TRA}$ is said wealth of said individual available for retirement less said budgeted lifestyle financial requirements of said individual accumulated at said rate of return equal to about an actual return of said at least one financial index, and
TerminalAnnuityValue$_{TRA}$ is the commuted cost of a life annuity for said individual as of a terminal retirement age (TRA) of said individual at a valuation interest rate and mortality basis sufficient to sustain an annual lifestyle amount for the remainder of said individual's life.

* * * * *